United States Patent [19]

Gabriel et al.

[11] Patent Number: 5,144,375
[45] Date of Patent: Sep. 1, 1992

[54] SAGNAC OPTICAL LOGIC GATE

[75] Inventors: M. Christina Gabriel, Fair Haven; Henry H. Houh, Sea Bright; Norman A. Whitaker, Atlantic Highlands, all of N.J.

[73] Assignee: AT&T Bell Laboratories, Murray Hill, N.J.

[21] Appl. No.: 521,774

[22] Filed: May 10, 1990

[51] Int. Cl.$^5$ .............................................. G01B 9/02
[52] U.S. Cl. ...................... 356/345; 356/350; 385/16
[58] Field of Search .................. 356/345, 350; 250/227.19; 350/96.13, 96.15; 385/16

[56] References Cited

U.S. PATENT DOCUMENTS

| | | | |
|---|---|---|---|
| 4,761,050 | 8/1988 | Byron | 350/96.15 |
| 4,962,987 | 10/1990 | Doran | 350/96.15 |
| 4,973,122 | 11/1990 | Cotter et al. | 350/96.15 |
| 4,995,690 | 2/1991 | Islam | 350/96.15 |

OTHER PUBLICATIONS

M. C. Farries and D. N. Payne, "Optical fiber switch employing a Sagnac interferometer" (Jul. 1989).
N. N. Islam et al., "Soliton switching in a fiber nonlinear loop mirror" (Aug. 1989).
M. J. LaGasse et al., "Ultrafast switching with a single-fiber interferometer" (Mar. 1989).
M. N. Islam, "All-optical cascadable NOR gate with gain" (Apr. 1990).
Yao Li et al., "Pulsed-mode laser Sagnac interferometry with applications in nonlinear optics and optical switching" (Jan. 1986).
M. Jinno and T. Matsumoto, "Ultrafast, low power, and highly stable all-optical switching in an all polarization maintaining fiber Sagnac interferometer" (Apr. 1990).

Primary Examiner—Samuel A. Turner
Attorney, Agent, or Firm—H. T. Brendzel

[57] ABSTRACT

An optical switch employs a modified sagnac arrangement that includes a sagnac loop and a coupler for injecting a signal into the loop and developing thereby two signals that travel along the loop in opposite directions. The coupler has at least one signal port that is accessible from outside the switch. In addition, a coupler is included to inject a pump signal into the loop to travel through the loop only in one direction. The loop is made of, or comprises, a material that has a controllable propagation speed. More particularly, the propagation speed in the material is a function of, for example, the intensity of the pump signal. The switch action is attained when the applied signals are in the form of pulses with pulse widths and relative positions are controlled to achieve a particular interaction. The switch action is observed by sending a pulse down a sagnac loop and observing its return. Switching is activated by either sending or not sending a pump pulse concurrently with the signal pulse that is sent down the sagnac loop. When a pump pulse is sent, it is timed to orient itself so that the pulse that propagates faster through the loop precedes the pulse that propagates slower. While propagating through the loop, the faster pulse overtakes and surpasses the slower pulse, causing the two pulses to transverse each other. In this manner the pump pulse affects the propagation speed of the pulse sent through the sagnac loop and modifies the phase of the affected pulse as it re-enters the sagnac coupler. When the intensity of the pump pulse is properly controlled, the phase shift caused by the pump pulse is such that no output appears at the port of the sagnac arrangement.

45 Claims, 5 Drawing Sheets

SAGNAC OPTICAL LOGIC GATE

BACKGROUND OF THE INVENTION

This invention relates to digital circuits and, more particularly, to high-speed optical digital circuits.

Prior art digital circuits mostly rely on electronic technology. Currents are induced in various materials through the application of electric fields, and the flowing currents that are induced combine with passive elements and nonlinear active elements to result in logic functions. Examples of such circuits are CMOS logic gates made by combinations of silicon FETs. Other semiconductors, such as gallium arsenide can be used as well. In an effort to increase the operational speed of such digital circuits, work has been carried out recently on electro-optic devices. The SEED device (Self Electro-optic Effect Device) is one such device. It is a surface device to which a light beam is applied and from which the applied light reflects or fails to reflect. The control mechanism that determines whether the SEED reflects or does not reflect comes by means of an electric field which is applied to the device and which generates carriers that affect the reflectivity of the SEED device. Thus the optical response of the SEED is modifiable through electronic control and although the optical path through the device may support a very large information bandwidth, the overall speed of operation may be limited by the speed of the control signal.

To gain access to a greater bandwidth that is inherent in optical signals, it is necessary to develop logic devices that are all-optical. One class of all-optical logic devices that have been developed rely on interferometric techniques that employ two distinct signal paths. One such example is a Mach-Zehnder interferometer which accepts a signal, splits it into two parts that are sent over two distinct paths, and recombines the signals of the two paths. The "switching" action is achieved by including a phase shifting element in one of the two paths. This element induces a phase shift that is controlled by the application of light and results in a constructive or destructive interference at the point where the two signals are recombined.

One problem with Mach-Zehnder devices with light-controlled phase-shifting elements is that light of a substantial intensity may be required over a long length of the phase shifting element. Consequently, the two paths in such Mach-Zehnder devices do not occupy the same space and are, therefore, subject to different temperatures, pressures, electric fields and other extraneous factors. As a result, the constructive and destructive combining at the output of such devices cannot be reliably controlled.

In an attempt to overcome the problems associated with using two distinct paths in Mach-Zehnder interferometer devices, M. J. LaGasse et al. describe a single fiber interferometer in an article titled "Ultrafast Switching with a Single-Fiber Interferometer", Optics Letters, Mar. 15, 1989, Vol. 14, No. 6, pp. 311-313. They describe an arrangement whereby a single circularly polarized pulse is split into two orthogonally polarized pulses, one of the pulses is slightly delayed, and the two resulting pulses are additively combined to form a pulse pair. The pulse pair is sent along a fiber which has the characteristic that the propagation speed through the fiber changes with the intensity of the beam that passes through the fiber. By adding a strong "pump" pulse that is timed to coincide with, say, the first pulse in the pulse pair, the phase shift of only that pulse is affected. Absent the "pump" pulse, the pulse pairs interfere constructively to form a single, more intense, linearly-polarized pulse. In the presence of the "pump" pulse, however, the combination results in destructive interference and no output pulse is produced. The fact that the two pulses travel down the fiber together helps to compensate against temperature changes, as the propagation delay for both interfering pulses is ideally the same.

One of the problems with this device is that the two pulses are of orthogonal linear polarizations, and this relationship must be maintained so that they can be effectively split and recombined at the output. One would like to use polarization-holding fiber for this purpose, but this device would not give the desired immunity to ambient temperature fluctuations since nearly all polarization-maintaining fiber has a birefringence which is highly temperature dependent. This device has another problem in the extraction of the "pump" signal which has the same polarization as the device output. This makes the device difficult to cascade. A third problem is the fact that the signal is split, one arm is delayed and has its polarization rotated, and the two signals are recombined at the output. This is in effect a Mach Zehnder, so it willonce again be susceptible to ambient conditions.

Another, single fiber, device relies on the interaction between pulses known as solitons. Solitons have the characteristic that they do not broaden when traveling through lengths of fiber. A logic device using solitons proposed by Islam et al. in an article titled "All-Optical Cascadable NOR Gate with Gain," Optics Letters, Vol. 15, pp. 417, 1990, uses the interaction of solitons traveling on the fast and slow axes of a birefringent fiber. Since the speeds of the two solitons (traveling on the different axes) are unequal, solitons which are injected with a slight time delay may actually catch up to each other, and when they do they capture, or trap, each other. The resulting trapped soliton pair propagates with a velocity slower than the original fast soliton. Thus, by observing the output at just the right time, one can detect the presence of the slow soliton by detecting the presence of some dragging of the fast soliton. Thus, the slow soliton acts as a control signal. The problem with this approach is that the dragging is only very slight, and other effects such as temperature fluctuations of the fiber are actually comparable in size to the soliton dragging time. Also, the output pulse must be sampled at precisely the right time, and the variability due to environment uncertainties makes the measurement unreliable even if the time when measurement is to be made is known with the requisite precision.

In a completely separate field of art, one that deals with gyroscopes, a device known as a Sagnac interferometer is used to measure rotation. The Sagnac interferometer comprises a fiber loop that has both ends of the fiber connected to the two output ports of a four port fiber directional coupler. Light is injected through one of the coupler's unused ports into the fiber. The coupler causes the injected light to be split, with one portion of the light traveling through the fiber loop in a clockwise direction, and the remaining portion of the light traveling through the fiber loop in a counter-clockwise direction. The light portions return to the coupler and recombine therein. Under normal circumstances, (when the gyro is not moving), the light is recombined in the coupler and completely reflected back to the source. The other unused port of coupler receives no light at all. When the fiber loop is rotated, the rotational movement causes the light that travels in one direction to re-enter the coupler slightly ahead of the light that travels in the opposite direction. The resultant combining of the light is different than before and, consequently, the light is no longer fully reflected to its source. This permits a measurement of the rotational movement of the gyroscope.

Employing the principles of the Sagnac interferometer, in an article titled "Pulsed-Mode Laser Sagnac Interferometry with Applications in Nonlinear Optics and Optical Switching", Applied Optics, Vol. 25, No. 2, January 1986, pp. 209-214, Li et al. describe an experimental setup employing a beam splitter and three mirrors that form an optical, square loop. In one of the loop legs adjacent to the beam splitter they include an element that is capable of induced refractive-index changes. A light pulse is applied to the beam splitter which causes one pulse to travel in a clockwise direction through the loop and another pulse to travel in a counter-clockwise direction through the loop. Still another pulse is derived from the original pulse to serve as a "pump" pulse that is separately applied to the variable refractive-index element. The two pulses that travel around the loop and meet at the beam splitter either combine constructively, when the "pump" pulse is absent, or destructively, when the "pump" pulse is present and is timed to coincide with presence of one of the pulses within the variable refractive-index element.

This arrangement has practical drawbacks in that it requires a beam splitter, three mirrors, a substantial dedication of space, and extreme sensitivity to the timing between the "pump" pulse and the pulses traveling around the loop. No provision is made for the "pump" pulse and the signal pulse to travel together except over the spatial volume in which they overlap in the variable refractive-index medium. Thus a considerable optical intensity will be necessary for the "pump" beam to sufficiently change the refractive index of the medium.

In "Soliton Switching in a Fiber Nonlinear Loop Mirror", Optics Letters, Vol. 14, No. 15, Aug. 1, 1989, pp. 811-813, Islam et al. describe a self-switching Sagnac interferometer. The basis of this arrangement is that the coupler of the Sagnac interferometer splits an incoming signal unevenly. By sending a high intensity signal into the device, the high intensity signal traveling in one direction causes, and concurrently experiences, a large phase shift. However, when a low intensity signal is sent into the device, the phase shift is correspondingly small. The result is that low-intensity signals are essentially reflected to the source, while high-intensity signals are not reflected to the source.

The problem with this arrangement, of course, is that one cannot control the switching, except by external modification of a signal's intensity.

In an article titled "Optical Fiber Switch Employing a Sagnac Interferometer", Applied Physics Letters, Vol. 55, pp. 25, 1989, Farries et al. describe a switch using a Sagnac interferometer with a signal beam of one wavelength and a pump beam of another wavelength. The signal beam is split evenly by the coupler, but the "pump" pulsed beam is injected into the Sagnac loop unevenly. Hence, the signal beam traveling clockwise around the loop experiences a different phase shift than the signal beam traveling counter-clockwise around the loop when the "pump" pulsed beam is present. Consequently, depending upon the presence of the "pump" beam, the signal beams combine destructively or constructively at the coupler.

Since different wavelengths are employed, it is difficult to cascade these devices. Also, the signal beam is not pulsed and, therefore, this device is not readily applicable to digital switching.

In an article entitled "Ultrafast, low power, and highly stable all-optical switching in an all polarization maintaining fiber Sagnac interferometer," Conference record of April 1990 topical Meeting on Photonic Switching, paper 13C-16, M. Jinno and T. Mitsumoto describe a Sagnac arrangement in which a wavelength sensitive polarization holding-coupler was used to couple the pump beam into the loop. This refinement allows a "pump" beam to be coupled into the loop through the input coupler of the interferometer. This device has only two ports, one for the "pump" beam and one for the signal beam. Pulses of different wavelength and different duration were used for the two signals, making the logic device non-cascadable. Polarization shifted fiber was used to ensure that the "pump" and signal pulses travel together.

SUMMARY OF THE INVENTION

The drawbacks of the prior art are overcome with an optical switch that employs a modified sagnac arrangement. Specifically, the switch includes a sagnac loop and a coupler for injecting a signal into the loop and developing thereby two signals that travel along the loop in opposite directions. The coupler has at least one signal port that is accessible from outside the switch. In addition, a coupler is included to inject a pump signal into the loop to travel through the loop only in one direction. The loop is made of, or comprises, a material that has a controllable propagation speed. More particularly, the propagation speed in the material is a function of one or more of the parameters of the signal that travels through it, such as intensity, polarizations, and wavelength. The switch action that is attained is most interesting when the applied signals are in the form of pulses, and in particular, when the pulse widths and relative positions (or relative timings) of the pulses are controlled to achieve a particular interaction.

Most materials propagate signals at different speeds when the signals differ in wavelength. Many materials also propagate signals at different speed when the signals differ in intensity and/or in polarization. Also, in many materials the propagation speed of one signal is affected by the concurrent flow of another signal.

This invention utilizes these facts to advantage by sending a pulse down a sagnac loop and observing its return. Concurrently, a pump signal, having the same wavelength, is either sent or is not sent. When a pump pulse is sent, it is timed to orient itself so that the pulse that propagates faster precedes the pulse that propagates slower. While propagating through the loop, the faster pulse overtakes and completely surpasses the slower pulse, causing the two pulses to traverse each other. (It should be kept in mind that the term "traverse" is used in a bilateral sense. When pulse A traverses pulse B, pulse B also traverses pulse A.) In this manner the pump pulse affects the propagation speed of the pulse sent through the sagnac loop and modifies the phase of the affected pulse as it re-enters the sagnac coupler. When the intensity of the pump pulse is properly controlled, the phase shift caused by the pump pulse is such that no output appears at the port of the sagnac arrangement where the signal pulse was first inserted.

DETAILED DESCRIPTION

Figure 1:
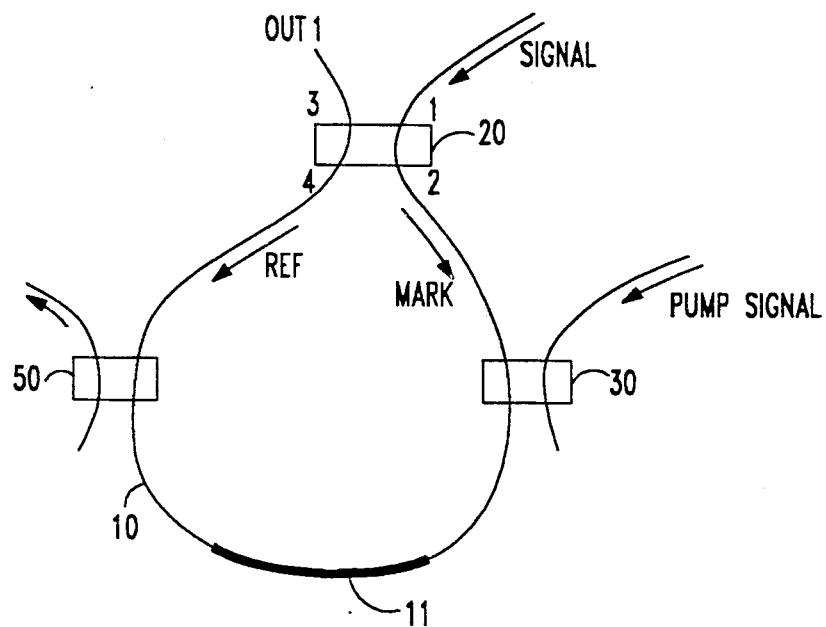
FIG. 1 presents a structure that embodies the principles of this invention.

The above described deficiencies in the prior art are overcome in a circuit as depicted in FIG. 1.

FIG. 1 includes a fiber element 10 that is connected at both ends to a coupler 20. An input signal is applied to port 1 of the coupler, ports 2 and 4 of the coupler are connected to the two ends of a fiber 10, and port 3 of the coupler forms a first output (OUT1) of the FIG. 1 arrangement. Fiber element 10 thus forms a loop, which in the context of this disclosure, refers to the path over which a signal travels and, more particularly, to arrangements where the path forms a closed, or nearly closed, figure.

So far, the FIG. 1 arrangement is merely a Sagnac interferometer which operates as follows. A signal applied to port 1 is split into two parts that exit the coupler at ports 2 and 4: a "mark" signal that travels clockwise, and a "ref" signal (reference signal) that travels counter-clockwise. The "mark" and "ref" signals travel through the loop in opposite directions, re-enter coupler 20 and recombine therein. Under normal circumstances, the "mark" and "ref" signals experience the same conditions as they travel through the loop. Even though the propagation speed is a function of many parameters that may be uncontrollable and may or may not change with time, the travel time of the "ref" and "mark" signals is short enough that, basically, all of the parameters remain static. Consequently, no changes occur within the loop to differentiate between the effects of the fiber on the traveling signals in the two directions. The result is a combining of signals in coupler 20 that is constructive with respect to port 1 and destructive with respect to port 3. In consequence, light that enters port 1 of the coupler is completely reflected back to port 1 of the coupler, and no output is delivered to port 3 of the coupler.

Returning to the description of FIG. 1, in addition to the above-described structure FIG. 1 includes a segment 11 along fiber 10 and a coupler 30 within the loop of fiber 10 that injects a "pump" signal into the loop. Because coupler 30 is within the loop, the "pump" signal travels along the loop only in one direction; and more specifically, coupler 30 is arranged to inject a "pump" signals that travels along the loop in the direction of the "mark" signal. A coupler 50 is also included within the loop of fiber 10 to extract the "pump" pulse out of the loop once it served its function. Segment 11 is a variable refractive-index material that is characterized by the property that the propagation speed of a beam passing through the material is a function of the energy of the beam that passes through the material. Furthermore, not only does the propagation speed change for the beam that effects the change in propagation speed, but it also changes the propagation speed of other beams that pass through the material at the same time. Of course, the entire length of fiber 10 may be made of such a variable refractive-index material, but for the sake of generality, FIG. 1 is drawn with only a limited segment being made up of this material. Also for the sake of generality, it should be pointed out that the remainder of the loop of fiber 10 in FIG. 1 does not necessarily have to be fiber. It can be a waveguide, free space, or other means for directing the flow of light. By the way, the above-discussed prior art experiments which use fiber use only such fiber.

In sum, the arrangement of FIG. 1 includes a fiber loop 10 having a controllable propagation speed material in segment 11, "mark" and "ref" signals traveling through it in opposite directions, and a "pump" signal that travels in the same direction as the "mark" signal; all combined in coupler 20. When the "mark" and "pump" signals are properly timed and conditioned, the result is a single-pole double-throw switch which operates as follows. When the "pump" signal is not present, the "mark" and "ref" signals are combined in coupler 20 as described above. The signal entering the switch at port 1 reflects out of the loop of fiber 10 and exits out of port 1 of coupler 20. However, when the "pump" signal is present and is made to travel through segment 11 with the "mark" signal, the change in propagation speed of the "mark" signal that is caused by the "pump" signal alters the phase of the "mark" signal arriving at coupler 20. When the energy in the "pump" signal and the interaction interval within segment 11 (between the "mark" and "pump" signals) are properly controlled, the phase relationship between the "mark" and "ref" signals causes the combining of the "mark" signal and the "ref" signal in coupler 20 to be completely destructive with respect to port 1 and completely constructive with respect to port 3. As a result, all of the energy exits at port 3 rather than at port 1. It may be noted in passing that the "ref" signal also passes through segment 11 and that its speed is also affected by the "pump" signal. But, since the "pump" signal and the "ref" signal travel in opposite directions, their interaction time is much shorter than the interaction time of the "mark" and the "pump" signals.

Figure 2:
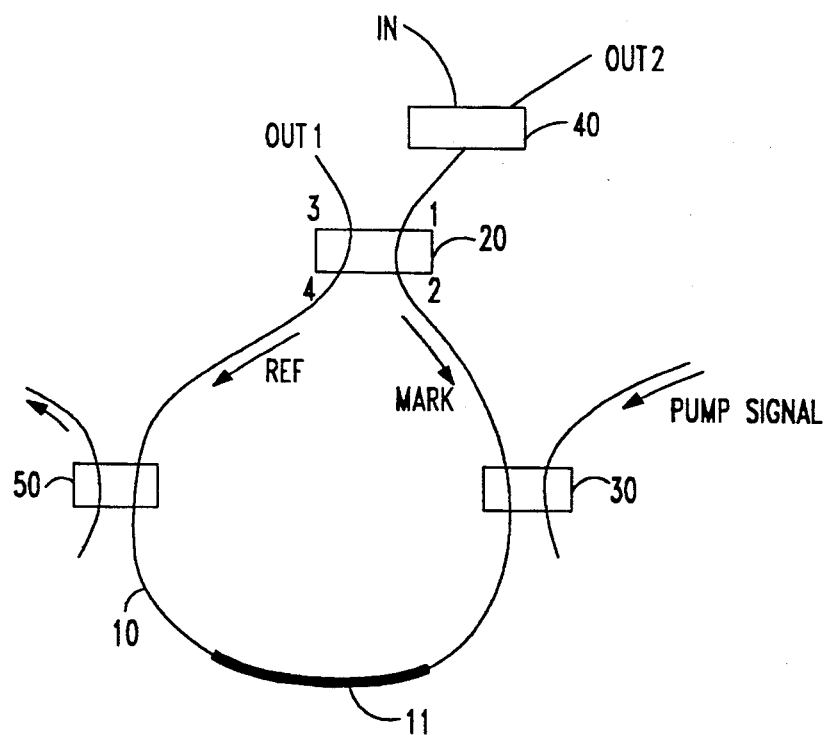
FIG. 2 depicts the structure of FIG. 1 with a circulator included to separate the input and output functions of one of the ports in the structure.

The diagrammatic equivalence of the FIG. 1 arrangement to a single-pole double-throw switch is more clearly observable in the FIG. 2 arrangement, which includes a circulator circuit 40 that is interposed between the input signal and port 1 of coupler 20. Circulator 40, which is a conventional element, serves to separate the signal entering port 1 of coupler 20 from the signal exiting coupler 20 at that port, thus creating the three ports that are commonly associated with a single-pulse double-throw switch: "IN", "OUT1" and "OUT2".

The primary aim of optical circuits in the filed of this invention is to create digital circuits of very high bandwidth. This translates to a requirement that our single-pole double-throw switch must be able to reliably respond to high repetition rate pulses that are very narrow. Very narrow pulses, however, can present a problem because such pulses typically comprise a sigmoid shaped signal at "turn-on" time, a very short flat signal at "on" time, and a sigmoid shaped signal at "turn-off" time. The turn-on and turn-off times of these narrow pulses constitute a substantial portion of the pulse width.

Pulsed signals, and particularly non-square shaped pulsed signals present a number of problems in the FIG. 1 circuit. First, the "pump" signal must be precisely timed to coincide with the "mark" signal if the "pump" signal is to affect the "mark" signal within segment 11. Second, since the intensity of the "pump" signal controls the change in propagation speed within segment 11, it follows that the "turn-on" and "turn-off" portions of the "pump" signal cause different changes in the propagation speed (as the intensity of the "pump" signal changes). Such different changes would cause different portions of the "mark" signal to travel at different speeds, which has the effect of altering the shape of the "mark" signal. One solution, of course, is to make the "pump" signal wide enough so that the "mark" signal is completely contained within the "on" time of the "pump" signal, throughout the travel of the "mark" signal within segment 11 (as was done by Jinna and Mitsumoto, described above). This, however, reduces the potential repetition rate of the "pump" signal and of the entire FIG. 1 arrangement. More importantly, this reduces the proportional difference between the effects of the "pump" signal on the "mark" signal and the effects of the "pump" signal on the "ref" signal, requires more power of the "pump" signal, and makes the arrangement not cascadable.

In accordance with the principles of this invention, these potential drawbacks are overcome by imposing a second requirement on the material of segment 11: to wit, that segment 11 propagate the "pump" signal at a different speed than the "mark" signal. The difference in the propagation speed may be tied to any controllable parameter of the "pump" signal, such as wavelength, intensity or polarization. As is described in greater detail below, this attribute of the material also makes the FIG. 1 circuit completely insensitive to the shape of the "pump" signal or its precise timing. Rather, it is only sensitive to the overall energy of the "pump" signal (integral of the pump pulse).

Figure 3:
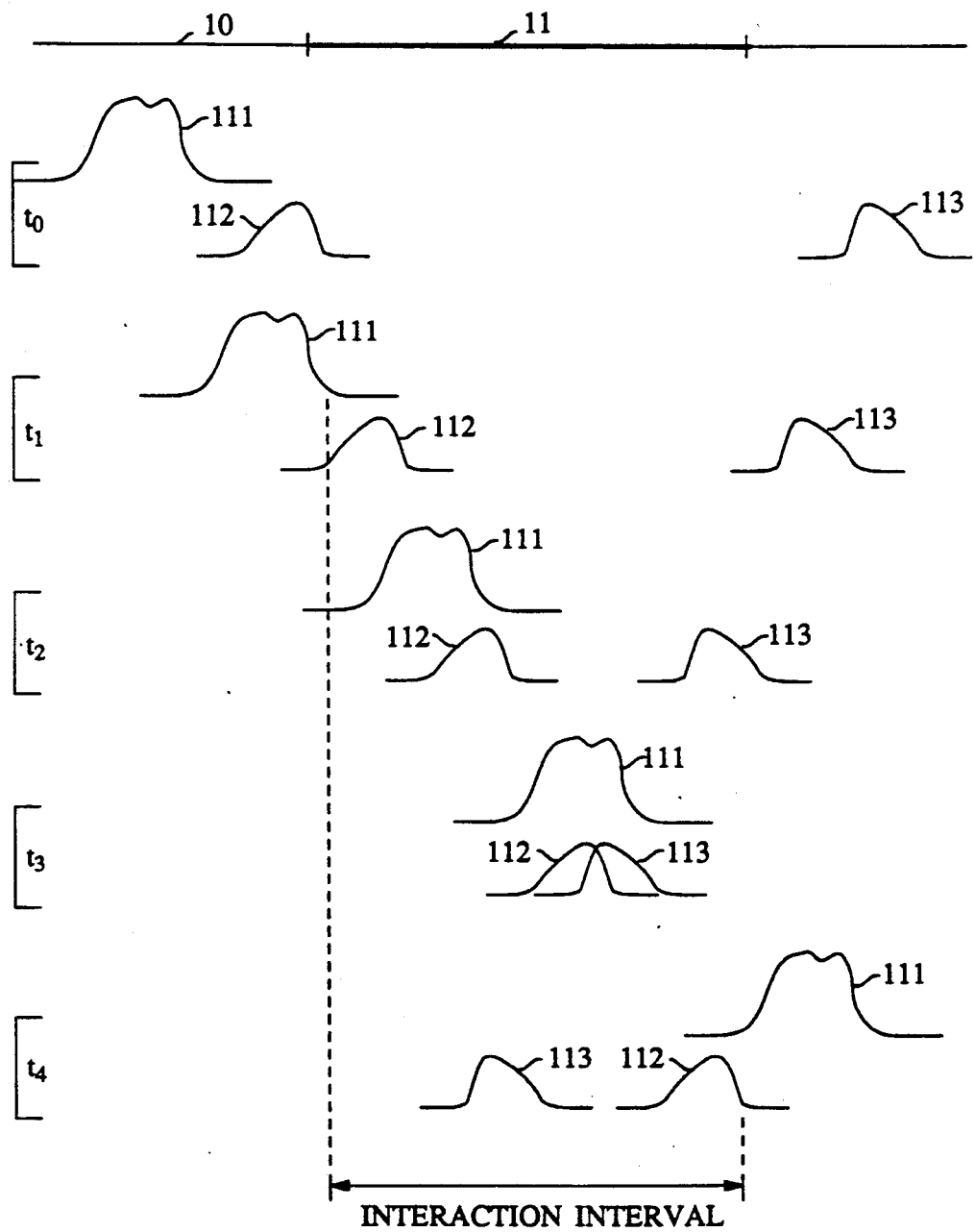
FIG. 3 presents a sequence of pulse positions that demonstrates the interactions of pulses within the FIG. 1 structure.

FIG. 3 depicts the operation of the FIG. 1 arrangement in connection with pulse signals, and demonstrates the advantages derived from the use of material 11 as specified above. A segment of fiber 10 with the material of segment 11 included is shown for reference. Pulse 111 represents the "pump" signal, pulse 112 represents the "mark" signal, and pulse 113 represents the "ref" signal; all at time $t_0$. Pulses 111 and 112 travel through segment 11 from left to right while pulse 113 travels from right to left. Pulse 111 precedes pulse 112, and it is assumed for purposes of FIG. 3, that "pump" pulse 111 travels faster through segment 11 than pulse 112. Pulse 113 is shown further to the right from segment 11 than pulse 112 is. This is to demonstrate that segment 11 does not need to be centered within the loop of fiber 10 vis-a-vis coupler 20.

At time $t_1$ greater than $t_0$, pulse 112 is shown to be within segment 11 and pulse 111 is just entering segment 11. Pulse 113 is still outside segment 11. At that time, the tail end of pulse 112 and the front end of pulse 111 coincide, and the pulse interaction begins. That is, the propagation speed of the tail end of pulse 112 begins to change in consequence of the front end of pulse 111.

At time $t_2$ greater than time $t_1$, FIG. 3 depicts pulses 111 and 112 in a more advanced state of interaction, while pulse 113 is within segment 11 but is not interacting with pulse 111.

At time $t_3$ greater than time $t_2$, pulse 111 is in full interaction with both pulses 112 and 113. Finally, at time $t_4$ greater than time $t_3$, the tail end of pulse 111 is passing by the front end of pulse 112 and ending the interaction between these two pulses.

From these snapshots of the three pulses, one can observe that each and every level of pulse 111 interacts with each and every level of pulse 112 over a substantial interval within segment 11; i.e., between times $t_1$ and $t_4$. Pulse 111 also interacts with pulse 113 but over a considerably shorter interval; i.e., only in the close neighborhood of time $t_3$. Although this is not shown in FIG. 3, one can easily see that the interaction with pulse 113 need not necessarily be within the material of segment 11.

The above demonstrates that the FIG. 1 arrangement is insensitive to the shape and to the precise timing of the "pump" signal; but it is important to maintain the parameter of the "pump" signal which controls the propagation speed thereof. When segment 11 is made of birefringent material where the propagation speed of a beam is dependent on the beam's polarization, it is important to maintain polarization.

Figure 4:
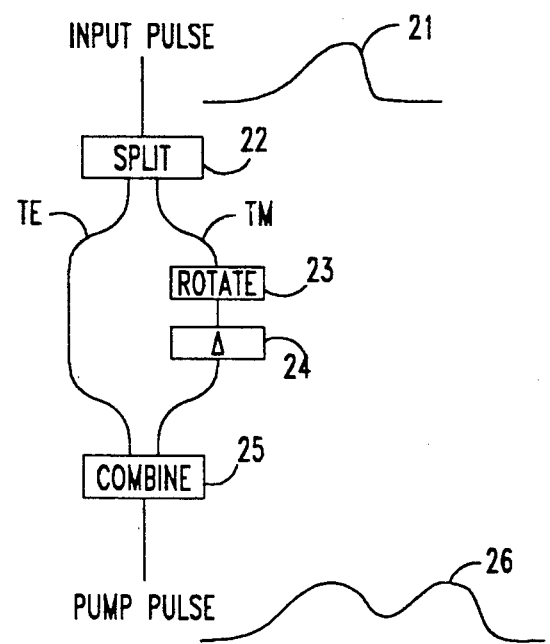
FIG. 4 illustrates the structure of one arrangement for creating a pump pulse having a known polarization.

In accordance with one aspect of our invention, the polarization of the "pump" signal is maintained while conserving all of the energy of an applied "pump" signal that has an unknown polarization. This is shown in FIG. 4. Therein, an input pulse 21 (of unknown polarization) is applied to a polarization-sensitive splitter 22. One output of splitter 22 has TE polarization while the other output has TM polarization. The TM polarization output is applied to polarization rotation circuit 23 and the output of circuit 23 (which is TE polarized) is applied to delay circuit 24. The TE signal of circuit 22 is combined with the delayed TE signal of circuit 24 in combiner 25 to yield a TE output signal having the shape depicted by pulse 26. The delay of circuit 24 is included to insure that the TE signal of circuit 22 does not interfere, constructively or destructively, with the TE signal of circuit 23.

Figure 5:
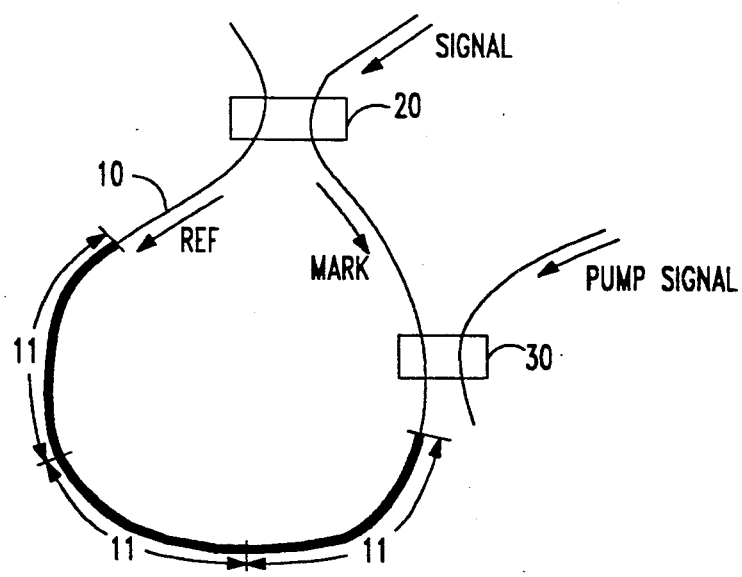
FIG. 5 shows an augmented structure that, in accordance with the principles of this invention permits a pump pulse to interact with a signal pulse more than one time.

It may occur that the speed difference between the "pump" signal and the "mark" signal is great enough to cause the interaction interval between the "pump" pulse and the "mark" pulse to span too short a distance within segment 11. The distance is too short when it induces a phase shift in the "mark" signal that is not sufficient to cause the desired interference between the re-entering "mark" and "ref" signals. As an aside, while the desired phase shift is $\pi$ radians, small deviations therefrom are not critical. The problem of insufficient phase shift that is developed in the course of the traversal of the "pump" signal by the "mark" signal is overcome by causing the "pump" signal to slide by, or traverse, the "mark" signal more than one time. This is accomplished, in accordance with this invention, by the arrangement depicted in FIG. 5 which contains a plurality of segments 11. The key to the operation of the FIG. 5 arrangement is that alternate segments 11 have opposite speed characteristics. That is, when the first segment 11 (first with respect to the traveling "pump" signal) causes signals of the "pump" signal's polarization to travel faster than signals of the "mark" signal's polarization, the second segment 11 is arranged to cause signals of the "pump" signal's polarization to travel slower than signals of the "mark" signal's polarization. Consequently, while in the first segment 11 the "pump" signal starts behind the "mark" signal and overtakes the "mark" signal within the segment, in the second segment the "mark" signal starts behind the "pump" signal and overtakes the "pump" signal within the segment. The same is repeated in subsequent pairs of segments, although there is no requirement that the last pair must be complete.

Figure 6:
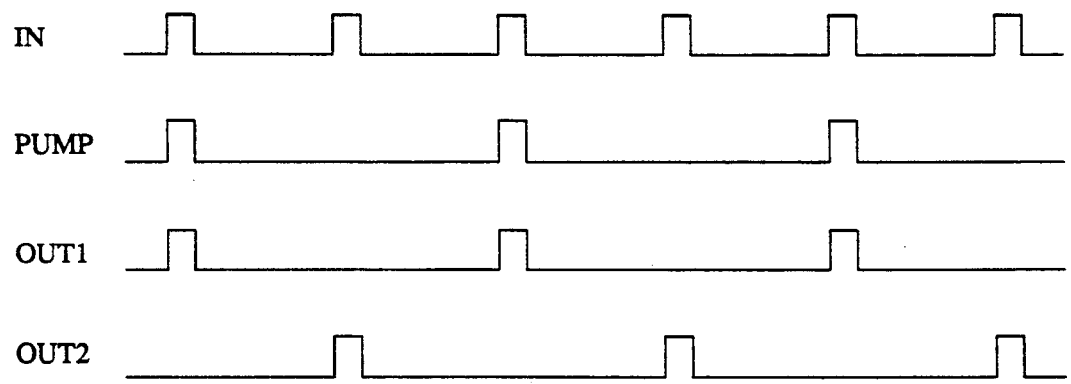
FIG. 6 is a timing diagram that illustrates the demultiplexer function of the FIG. 2 structure.

In application, the FIG. 2 circuit can be easily configured to be a multiplexer, a demultiplexer or a NOR gate. FIG. 6 depicts the signals arrangement for a demultiplexer application. The multiplexed signal is shown at the top, and below it is shown the "pump" signal. By including a pulse along the "pump" signal line every N pulses in the signal line (N being 2 in FIG. 6), a 1 out of N of the signal line pulses appear at the OUT1 port of the FIG. 2 arrangement. The signal pulses not appearing at OUT1 port appear at the OUT2 port of the FIG. 2 arrangement.

Figure 7:
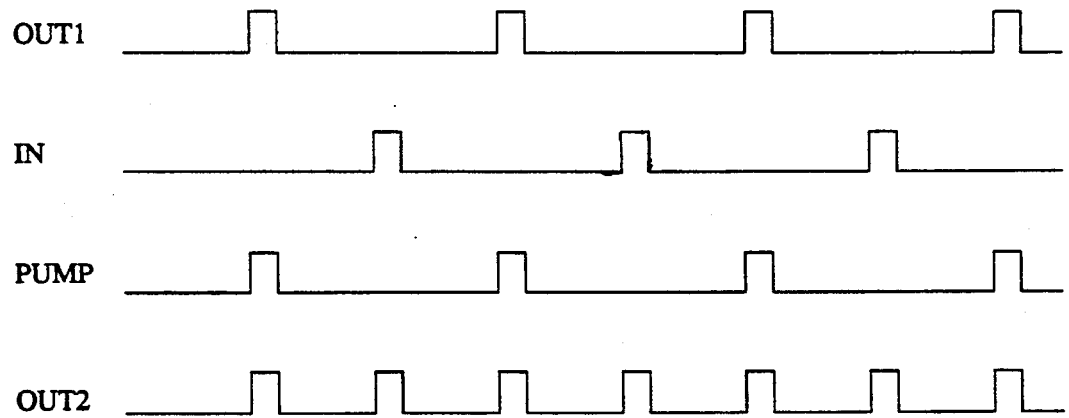
FIG. 7 is a timing diagram that illustrates the multiplexer function of the FIG. 2 structure.

FIG. 7 depicts the signals arrangement for a multiplexer application. The two signals to be multiplexed are injected into ports IN and OUT1 of the FIG. 2 arrangement. When a "pump" pulse appears each time a pulse is injected into port OUT1, the result is that both input signals appear at port OUT2.

Figure 8:
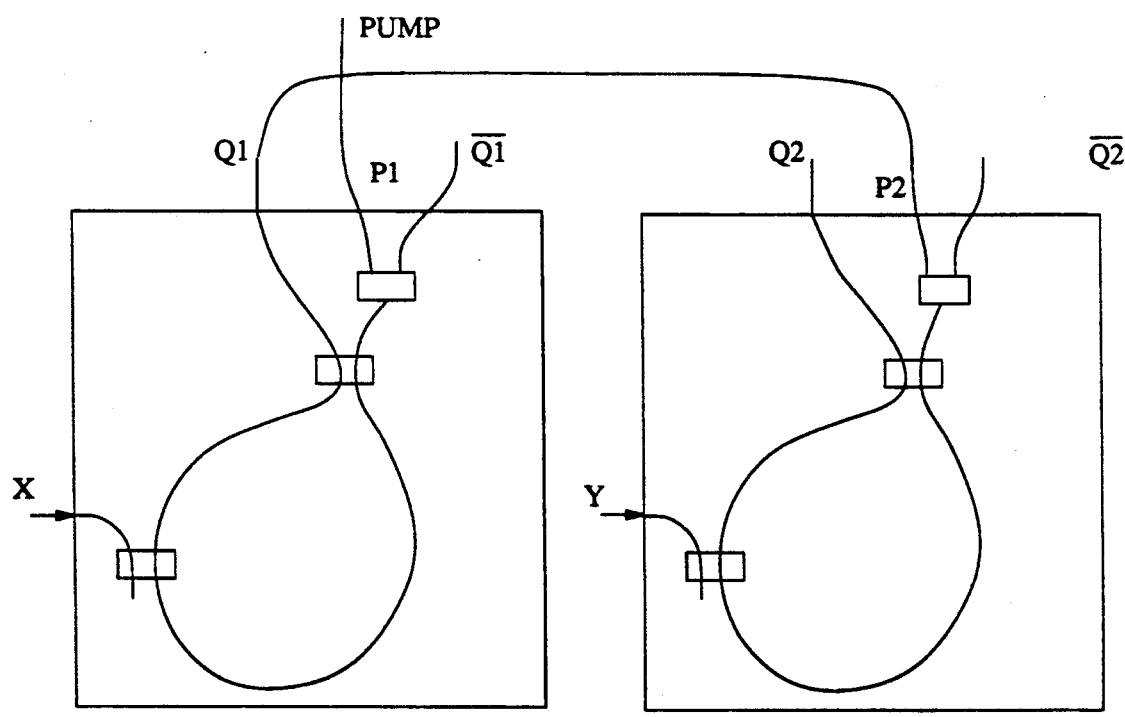
FIG. 8 depicts a cascading of the arrangement shown in FIG. 2 which produces a logic gate.

The cascadability of our arrangement and the realization of an AND logic gate is depicted in FIG. 8 which includes two switches of the FIG. 2 variety that are cascaded. In FIG. 8, the input marked "P1" is akin to a power supply input. It injects pulses into the sagnac loop, and results in an output pulses at output $\overline{Q1}$ when there is no input at the x port. When a pulse is injected into port x, a corresponding pulse appears at output port Q1. That output is injected into port P2 and, if at that time, a pulse is applied at port y, then a pulse appears at output port Q2. The AND function results at port Q2 since a pulse signal appears at port Q2 only when both port x and port y supply a signal.

Whereas FIG. 8 depicts an arrangement whereby the FIG. 3 circuit is used to construct an all-optical logic gate, it should be realized that the circuit can be applied to other uses. For example, the FIG. 3 can be applied to regenerate the amplitude and timing of received signals. That is, an optical computing component that is somewhat remote may be sending information to a nearby optical circuit. The signal that is expected comprises optical pulses or lack thereof at a particular repetition rate, in synchronism with a clock. The objective of the nearby circuit, therefore, is to capture the received signal and synchronize it to the local clock.

This objective is met with the circuit of FIG. 3 that is used as shown by the left half of the FIG. 8 arrangement. That is, the local clock is injected into the input port of the sagnac loop (port P1) and the input signals that is to be "synched" to the clock is injected into the x port. As long as the input signal pulse is not narrower than the desired width of the output pulse, the jitter-free output of the clock pulse that is coincident with the input pulse would be of the proper desired width.

We claim:

1. An arrangement having an input port for receiving an input signal and a transmission medium comprising a controllable propagation speed material through which the input signal travels, COMPRISING:

means for injecting a signal pulse applied at said input port, into said material, to develop an interacting signal that travels in said material in one direction and a reference signal that travels in said material in the opposite direction;

means for controllably injecting a pump pulse into said material, to travel through said material in said one direction at a speed that is different from the speed of said interacting signal and to thus form two co-acting pulses that travel at said one direction, with the timing of said pump pulse, in relation to said interacting signal, controlled to position the faster one of the co-acting pulses behind the slower one of the co-acting pulses, to cause the faster one of the co-acting pulses to overtake and surpass the slower one of the co-acting pulses as the co-acting pulses travel in said material; and means for combining said reference signal after its travel through said material and said interacting pulse after its travel through said material.

2. The arrangement of claim 1 wherein said means for combining is interferometric combining means.

3. The arrangement of claim 2 wherein said combining means develops an output signal at an output port when the pulses applied to said combining means interfere constructively.

4. The arrangement of claim 2 wherein said combining means develops an output signal at a first output port when the pulses applied to said combining means interfere constructively and an output signal at a second output port when the pulses applied to said combining means interfere destructively.

5. The arrangement of claim 1 wherein said means for controllably injecting includes at least one of the following: means for injecting a pump pulse approximately when an interacting pulse is present in said transmission medium, means for injecting a pump pulse with an interacting pulse is absent in said transmission medium, and means for abstaining from injecting a pulse when an interacting pulse is present in said transmission medium.

6. The arrangement of claim 1 wherein said controllable propagation speed material is characterized by a propagation speed that is a function of a controllable signal parameter of said pump pulse.

7. The arrangement of claim 6 wherein said controllable signal parameter is the wavelength of the pump pulse.

8. The arrangement of claim 7 wherein said signal pulse is of one wavelength and said pump pulse is of a different wavelength.

9. The arrangement of claim 6 wherein said controllable signal parameter is the polarization of the pump pulse.

10. The arrangement of claim 6 wherein said controllable signal parameter is the intensity of the pump pulse.

11. The arrangement of claim 10 wherein said pump pulse is controlled to provide an intensity that produces a phase shift of said interacting signal as it travels said controllable propagation speed material with said pump signal that is altered by substantially $\pi$ radians from the phase shift of said interacting signal as it travels said controllable propagation speed material without said pump signal.

12. The arrangement of claim 10 including means for controlling the intensity of said pump pulse to develop substantially a 180 degree phase shift in said signal pulse as it passes through said controllable propagation speed material in one direction relative to the phase shift of said signals pulse as it passes through said controllable propagation speed material in the other direction.

13. The arrangement of claim 6 wherein said controllable signal parameter is the intensity and polarization of the pump pulse.

14. The arrangement of claim 13 wherein said pump pulse is controlled to provide a polarization and an intensity that produces a phase shift of said interacting signal as it travels said controllable propagation speed material with said pump signal that is altered by substantially $\pi$ radians from the phase shift of said interacting signal as it travels said controllable propagation speed material without said pump signal.

15. The arrangement of claim 1 wherein the controllable propagation speed material in said transmission medium is of a material where signals of orthogonal polarization propagate at different speeds and where the propagation speed for a given polarization when a signal of orthogonal polarization is present differs from the propagation speed for that given polarization when the signal of orthogonal polarization is absent.

16. The arrangement of claim 15 wherein said interacting signal is polarized and said pump pulse is polarized, and the polarization of said interacting signal is orthogonal to the polarization of said pump pulse.

17. The arrangement of claim 1 wherein said means for injecting a signal pulse is a four-port coupler having its first port connected to said input port, its second and third ports connected to two ports of said transmission medium, the ports being both input and output ports, and its fourth port forming a first output port of said arrangement.

18. The arrangement of claim 1 including a first output port of said arrangement that is coupled to said means for injecting a signal pulse and further comprising a circulator interposed between the input port of said arrangement and the means for injecting a signal pulse, with said circulator including a second output port of said arrangement.

19. The arrangement of claim 18 including means for controlling said pump pulse to develop an output signal at the first output port of said arrangement when the energy of said pump pulse is at a first level, and at the second output port of said arrangement when the energy of said pump pulse is at a second level.

20. The arrangement of claim 1 further comprising a coupler connected to said transmission medium for extracting the pump pulse traveling in said medium.

21. A arrangement comprising an interconnection of a plurality of switches CHARACTERIZED IN THAT:
   each switch comprises
   1) a first input port for receiving an input signal pulse;
   2) a second input port for receiving a pump pulse;
   3) an output port;
   4) a transmission medium comprising a controllable propagation speed material through which said input pulse and said pump pulse can travel;
   5) means for injecting a signal pulse applied at said first input port, into said medium, to develop an interacting signal that travels in said medium in one direction and a reference signal that travels in said medium in the opposite direction, and for accepting signals arriving from said medium to develop an output pulse that is applied to said output port; and
   6) means for controllably injecting a pump pulse applied at said second input port, into said medium, that travels through said medium in the direction of said interacting signal at a speed of travel that is different from the speed of travel of the interacting signal, thus forming two co-acting pulses traveling in said one direction, and with a timing relationship with respect to the interacting pulse that positions the faster of the co-acting pulses behind the slower of the co-acting pulses, to cause the faster of the co-acting pulses to overtake and surpass the slower of the co-acting pulses as the co-acting pulses travel in said controllable propagation speed material.

22. The arrangement of claim 21 wherein each of said switches further comprises a second output port that derives a signal from said means for injecting a signal pulse, the derived signal being complementary to the signal of said first output port.

23. The arrangement of claim 21 wherein said plurality of switches comprises a first switch and a second switch where the output port of the first switch is connected to the first input port of the second switch.

24. The arrangement of claim 21 wherein said plurality of switches comprises a first switch and a second switch where the output port of the first switch is connected to the second input port of the second switch.

25. The arrangement of claim 24 wherein said second switch further comprises a second output port that derives a signal from said means for injecting a signal pulse, the derived signal being complementary to the signal of said first output port.

26. An arrangement having an input port for receiving an input signal, a transmission medium through which the input signal travels, and a controllable propagation speed material at least in a portion of the medium, comprising:
   means in said medium for injecting a train of signal pulses in said input port, with each signal pulse in said train of signal pulses developing an interacting signal that travels in said medium in one direction and a reference signal that travels in said medium in the opposite direction;
   means for injecting a train of pump pulses into said medium, that travels in said medium in the direction of said interacting signal at a different speed of travel than the speed of travel of the interacting signal;
   wherein each pump pulse in said train of pump pulses is
   a) injected at a time, relative to a corresponding signal pulse in said train of signal pulses, that permits the faster pulses traveling in the direction of said interacting signal to overtake and surpass the slower pulses traveling in the direction of said interacting signal while the pulses are within the controllable propagation speed material, and
   b) controlled in intensity to, at times, develop a pump pulse of high magnitude and, at times, develop a pump pulse of low magnitude.

27. The arrangement of claim 26 wherein said low magnitude includes a zero or a substantially zero magnitude.

28. The arrangement of claim 27 wherein alternate pump pulses in said train of pump pulses are of low magnitude.

29. An arrangement having a first signal port, a second signal port, a pump signal port, a transmission medium that incudes a controllable propagation speed material, comprising:
- a first coupler connected to said transmission medium for
  1) injecting into said transmission medium, in response a signal pulse applied at the first signal port, a mark1 pulse that travels through said medium in a first direction and a ref1 pulse that travels through said medium in a second direction that is opposite to said first direction,
  2) injecting into said transmission medium, in response to a signal pulse applied at the second signal port, a mark2 pulse that travels through said medium in said first direction, and a ref1 pulse that travels through said medium in said second direction, and
  3) combining signals arriving from said transmission medium and to develop a first output signal that is applied to said first signal port and a second output signals that is applied to said second output port; and
- a second coupler for injecting a pump pulse signal into said medium, that travels through said medium in said first direction that travels at a different speed of travel than the speed of travel of the mark1 and mark2 pulses;
- wherein said pump pulse signal comprises one or more pulses, with a pulse being controllably present when a mark1 pulse travels through the medium, and controllably present when a mark2 pulse travels through the medium, and each pump pulse, when present, has a timing relationship with respect to mark1 and mark2 pulses that is controlled to cause the faster of the pulses traveling in said first direction to begin behind the slower of the pulses traveling in said first direction and to overtake and surpass said slower of the pulses traveling in said first direction while the mark1 and mark2 pulses are substantially within the controllable propagation speed material.

30. The arrangement of claim 29 wherein the input signal applied to the first signal port is a train of pulses having a given repetition rate, wherein the input applied at the pump signal port is a train of pulses that has half the given repetition rate, and the train of pump signal pulses is adjusted to approximately coincide with every other one of the pulses in the train of pulses at the first signal port.

31. The arrangement of claim 29 wherein the input signal applied to the first signal port is a train of pulses having a given repetition rate, wherein the input applied at the pump signal port is a train of pulses that has said given repetition rate with the train of pump signal pulses adjusted to approximately coincide with the pulses in the train of pulses at the first signal port, and wherein the input signal applied at the second signal port is a train of pulses that is adjusted to not coincide with the pulses in the train of pulses at the pump signal port.

32. A sagnac interferometer having a loop connected to a coupler, including input means for injecting a signal into said loop that travels along said loop in both directions, and output means for observing output reflected off said loop, CHARACTERIZED IN THAT:
- said loop includes at least a section of controllable propagation speed material;
- said signal injected by said input means is a pulse, developing thereby an interacting pulse that travels along said loop in one direction and a reference pulse that travels along said loop in the opposite direction; and
- said interferometer further comprises means for controllably injecting a pump signal into said loop that travels along said loop in the direction of said interacting signal at a speed that is different from the speed of said interacting signal and timed to position the faster pulse traveling in said one direction behind the slower pulse traveling in said one direction and to overtake and surpass the slower pulse traveling in said one direction while said interacting pulse is traveling through said controllable propagation speed material.

33. The arrangement of claim 32 wherein said means for controllably injecting includes means for controlling the intensity of said pump pulse to develop constructive and destructive interference of said signal pulse within said coupler of said sagnac interferometer.

34. The arrangement of claim 33 wherein said means for injecting a pump pulse is within said loop.

35. The arrangement of claim 32 wherein said loop comprises a waveguide.

36. The arrangement of claim 32 wherein said loop comprises a birefringent fiber.

37. An arrangement having an input port for receiving an input signal, a transmission medium through which the input signal travels, and a plurality of controllable propagation speed material segments M in the medium through which the signal travels, comprising:
- means for injecting a signal pulse applied at said input port into said medium, to develop an interacting signal that travels in said medium in one direction at speed x and a reference signal that travels in said medium in the opposite direction at speed x;
- means for controllably injecting a pump pulse into said medium, that travels through said medium in the direction of said interacting signal at speed $x+\delta$, $\delta$ having a positive or negative value of magnitude greater than zero;
- wherein said pump pulse, when injected, is injected at a time, relative to said interacting signal and to said $\delta$, to cause every point of the interacting signal to interact with every point of the pump pulse, while in each of said segments M.

38. The arrangement of claim 37 further comprising a reset section interposed between adjacent segments M that modifies the position of said pump pulse relative to said interaction signal, at the entry of the reset section, to the position of the pump pulse relative to said interaction signal at the beginning of segment M that precedes the reset section.

39. The arrangement of claim 37 further comprising a reset section interposed between adjacent segments M that modifies the timing of said pump pulse relative to said interaction signal, at the entry of the reset section, to the timing of the pump pulse relative to said interaction signal at the beginning of segment M that precedes the reset section.

40. The arrangement of claim 38 wherein said reset sections comprise controllable propagation speed material.

41. The arrangement of claim 40 wherein said segments M comprise birefringent fiber segments.

42. The arrangement of claim 40 wherein said reset sections comprise birefringent fiber segments.

43. The arrangement of claim 42 wherein the polarization orientation of the birefringent fiber segments of the reset sections is orthogonal to the polarization orientation of the segments M.

44. An arrangement for developing a pump pulse comprising:

splitter means, responsive to an applied input signal, for separating said input signal into a plurality of signal components having a given polarization orientation, with one of the signal components being a reference signal component;

polarization rotation means applied to each of the signal components other than said reference signal component to convert the polarization orientation of those signal components to the polarization orientation of the reference signal component;

delay means applied to the outputs of said polarization rotation means for developing a different delay for each of the signal components; and means for combining said reference signal component and the output signals of said delay means.

45. An arrangement for synchronizing an incoming pulse to a given clock pulse comprising:

a pulse transmission material capable of concurrently transmitting a plurality of pulses and characterized by a transmission speed that depends of a given characteristic of the pulse traveling therethrough and further characterized by a transmission speed that is affected by the concurrent transmission of pulses therethrough, a first input port for receiving said incoming pulse and injecting it into said first input port at one value of said given characteristic, causing said incoming pulse to travel through said material at one speed, and a second input port for injecting said clock pulse into said second input port at another value of said given characteristic, causing said clock pulse to travel through said material at another speed, with said injecting being timed to cause the incoming pulse and the clock pulse that travel through said material to traverse each other.

* * * * *